United States Patent
Basu Mallick et al.

(10) Patent No.: US 11,419,184 B2
(45) Date of Patent: Aug. 16, 2022

(54) MULTIPLE RADIO ACCESS TECHNOLOGY COMMUNICATIONS

(71) Applicant: Lenovo (Singapore) PTE. LTD., New Tech Park (SG)

(72) Inventors: Prateek Basu Mallick, Dreieich (DE); Karthikeyan Ganesan, Kaiserslautern (DE); Joachim Loehr, Wiesbaden (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 62 days.

(21) Appl. No.: 16/832,360

(22) Filed: Mar. 27, 2020

(65) Prior Publication Data
US 2020/0314960 A1    Oct. 1, 2020

Related U.S. Application Data

(60) Provisional application No. 62/825,711, filed on Mar. 28, 2019.

(51) Int. Cl.
| | |
|---|---|
| *H04W 88/06* | (2009.01) |
| *H04W 4/44* | (2018.01) |
| *H04W 76/14* | (2018.01) |
| *H04W 76/27* | (2018.01) |
| *H04W 28/02* | (2009.01) |

(Continued)

(52) U.S. Cl.
CPC ............. *H04W 88/06* (2013.01); *H04W 4/44* (2018.02); *H04W 28/0268* (2013.01); *H04W 72/02* (2013.01); *H04W 72/1242* (2013.01); *H04W 72/14* (2013.01); *H04W 76/14* (2018.02); *H04W 76/27* (2018.02)

(58) Field of Classification Search
CPC ............... H04L 5/0044; H04L 5/0053; H04W 28/0268; H04W 4/44; H04W 72/02; H04W 72/1242; H04W 72/14; H04W 76/14; H04W 76/27; H04W 88/06
See application file for complete search history.

(56) References Cited

U.S. PATENT DOCUMENTS

| | | | |
|---|---|---|---|
| 2018/0048994 A1* | 2/2018 | Kwon | H04W 72/02 |
| 2020/0100048 A1* | 3/2020 | Wu | H04L 5/0055 |

(Continued)

FOREIGN PATENT DOCUMENTS

WO    2019029375 A1    2/2019

OTHER PUBLICATIONS

3GPP, "3rd Generation Partnership Project; Technical Specification Group Services and System Aspects; Study on architecture enhancements for EPS and 5G System to support advanced V2X services (Release 16)", 3GPP TR 23.786 V2.0.0, Mar. 2019, pp. 1-119.

(Continued)

*Primary Examiner* — Kashif Siddiqui
(74) *Attorney, Agent, or Firm* — Kunzler Bean & Adamson

(57) ABSTRACT

Apparatuses, methods, and systems are disclosed for multiple radio access technology communications. One method includes receiving at a user equipment, from a first radio access technology, resources for a second radio access technology. The method includes receiving at the user equipment, from the first radio access technology, sidelink radio bearer configuration information.

22 Claims, 7 Drawing Sheets

(51) Int. Cl.
　　　*H04W 72/02*　　　(2009.01)
　　　*H04W 72/12*　　　(2009.01)
　　　*H04W 72/14*　　　(2009.01)

(56) References Cited

U.S. PATENT DOCUMENTS

| | | | | |
|---|---|---|---|---|
| 2020/0146082 | A1* | 5/2020 | Chen | H04W 28/0278 |
| 2020/0163005 | A1* | 5/2020 | Rao | H04W 4/40 |
| 2020/0229145 | A1* | 7/2020 | Kang | H04W 72/042 |
| 2020/0275413 | A1* | 8/2020 | Zhang | H04W 72/0486 |
| 2020/0359368 | A1* | 11/2020 | Loehr | H04W 72/0446 |
| 2020/0403731 | A1* | 12/2020 | Zhang | H04W 76/14 |

OTHER PUBLICATIONS

Huawei (Rapporteur), "Summary of Email Discussion [104#58][NR V2X]—QoS support for NR V2X", 3GPP TSG-RAN WG2 Meeting #105 R2-1900370, Feb. 25-Mar. 1, 2019, pp. 1-57.

PCT/IB2020/000227, "Notification of Transmittal of the International Search Report and the Written Opinion of the International Searching Authority, or the Declaration", PCT ISA, dated Jul. 28, 2020, pp. 1-11.

Qualcomm Incorporated, "Discussion on QoS design for NR PC5 communication", 3GPP TSG-RAN WG2 Meeting #105 R2-1901729, Feb. 25-Mar. 1, 2019, pp. 1-6.

Lenovo, Motorola Mobility, "QoS management for NR V2X", 3GPP TSG-RAN WG2 Meeting #105 R2-1901053, Feb. 25-Mar. 1, 2019, pp. 1-6.

\* cited by examiner

MULTIPLE RADIO ACCESS TECHNOLOGY COMMUNICATIONS

CROSS-REFERENCE TO RELATED APPLICATIONS

This application claims priority to U.S. Patent Application Ser. No. 62/825,711 entitled "PROVISIONING LOWER LAYER CONFIGURATIONS FOR CROSS-RAT V2X COMMUNICATION" and filed on Mar. 28, 2019 for Prateek Basu Mallick, which is incorporated herein by reference in its entirety.

FIELD

The subject matter disclosed herein relates generally to wireless communications and more particularly relates to multiple radio access technology communications.

BACKGROUND

The following abbreviations are herewith defined, at least some of which are referred to within the following description: Third Generation Partnership Project ("3GPP"), $5^{th}$ Generation ("5G"), 5G System ("5GS"), 5G Core Network ("5GC"), QoS for NR V2X Communication ("5QI/PQI"), 5G QoS Indicator ("5QI"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Programming Interface ("API"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Cellular Internet of Things ("CIoT"), Closed-Loop ("CL"), Configuration Management ("CM"), Coordinated Multipoint ("CoMP"), Channel Occupancy Time ("COT"), Core Network ("CN"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Dedicated Control Channel ("DCCH"), Dedicated Traffic Channel ("DTCH"), Downlink Pilot Time Slot ("DwPTS"), Enhanced Clear Channel Assessment ("eCCA"), EPS Connection Management ("ECM"), Enhanced DRX ("eDRX"), Enhanced Mobile Broadband ("eMBB"), Enhanced MTC ("eMTC"), Evolved Node B ("eNB"), Extensible Authentication Protocol ("EAP"), Effective Isotropic Radiated Power ("EIRP"), Evolved Packet Core ("EPC"), Evolved Packet System ("EPS"), European Telecommunications Standards Institute ("ETSI"), Evolved Universal Terrestrial Radio Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Service ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home SMF ("H-SMF"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), LTE for Machines ("LTE-M"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Mobile Initiated Connection Only ("MICO"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NS SF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Protocol Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Prose Per Packet Priority ("PPPP"), Prose Per Packet Reliability ("PPPR"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Power Saving Mode ("PSM"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology/Type ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/ Transparent Mode ("RLC-UM/TM"), Radio Link Failure ("RLF"), Radio Link Monitoring ("RLM"), Registration Management ("RM"), RAN Notification Area ("RNA"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformation-BlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Radio Bearer ("SLRB"), Sidelink Synchronization Signals ("SLSS"), Session Management ("SM"), Session Management Function ("SMF"), Special Cell ("SpCell"), Single Network Slice Selection Assistance Information ("S-NS-SAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Universal Terrestrial Radio Access Network ("UTRAN"), Radio interface between a UE and a RAN ("Uu"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Vehicular Quality Index ("VQI"), Wide Area Network ("WAN"), and Worldwide Interoperability for Microwave Access ("WiMAX").

In certain wireless communications networks, multiple RATs may be used.

BRIEF SUMMARY

Methods for multiple radio access technology communications are disclosed. Apparatuses and systems also perform the functions of the methods. One embodiment of a method includes receiving, from a first radio access technology, resources for a second radio access technology. In certain embodiments, the method includes receiving, from the first radio access technology, sidelink radio bearer configuration information.

One apparatus for multiple radio access technology communications includes a receiver that: receives, from a first radio access technology, resources for a second radio access technology; and receives, from the first radio access technology, sidelink radio bearer configuration information.

Another embodiment of a method for multiple radio access technology communications includes transmitting, from a first radio access technology, resources for a second radio access technology. In various embodiments, the method includes transmitting, from the first radio access technology, sidelink radio bearer configuration information.

Another apparatus for multiple radio access technology communications includes a transmitter that: transmits, from a first radio access technology, resources for a second radio access technology; and transmits, from the first radio access technology, sidelink radio bearer configuration information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
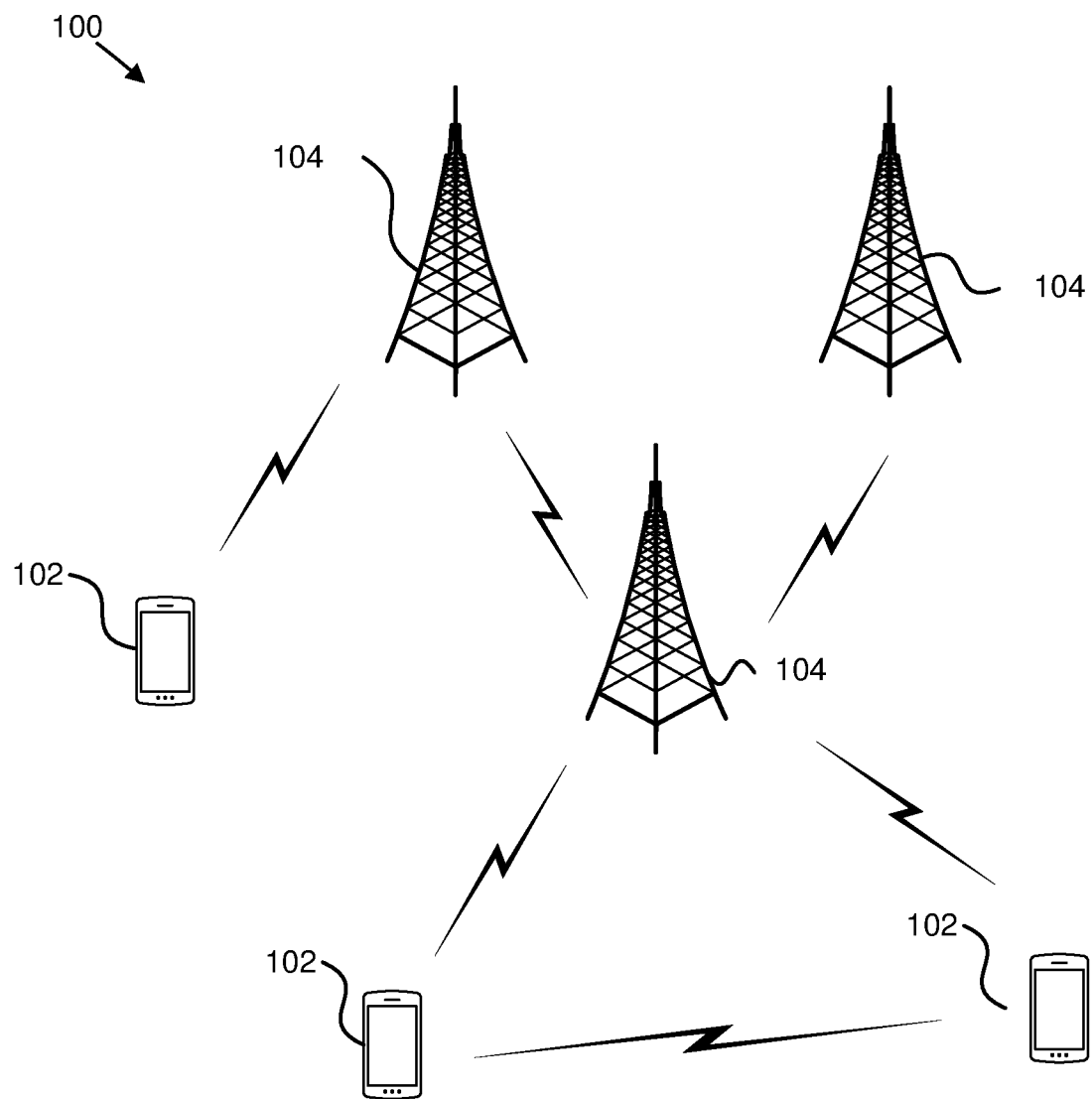
FIG. 1 is a schematic block diagram illustrating one embodiment of a wireless communication system for multiple radio access technology communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiple radio access technology communications. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, from a first radio access technology, resources for a second radio access technology. In certain embodiments, the remote unit 102 may receive, from the first radio access technology, sidelink radio bearer configuration information. Accordingly, the remote unit 102 may be used for multiple radio access technology communications.

In some embodiments, a network unit 104 may transmit, from a first radio access technology, resources for a second radio access technology. In various embodiments, the network unit 104 may transmit, from the first radio access technology, sidelink radio bearer configuration information. Accordingly, the network unit 104 may be used for multiple radio access technology communications.

Figure 2:
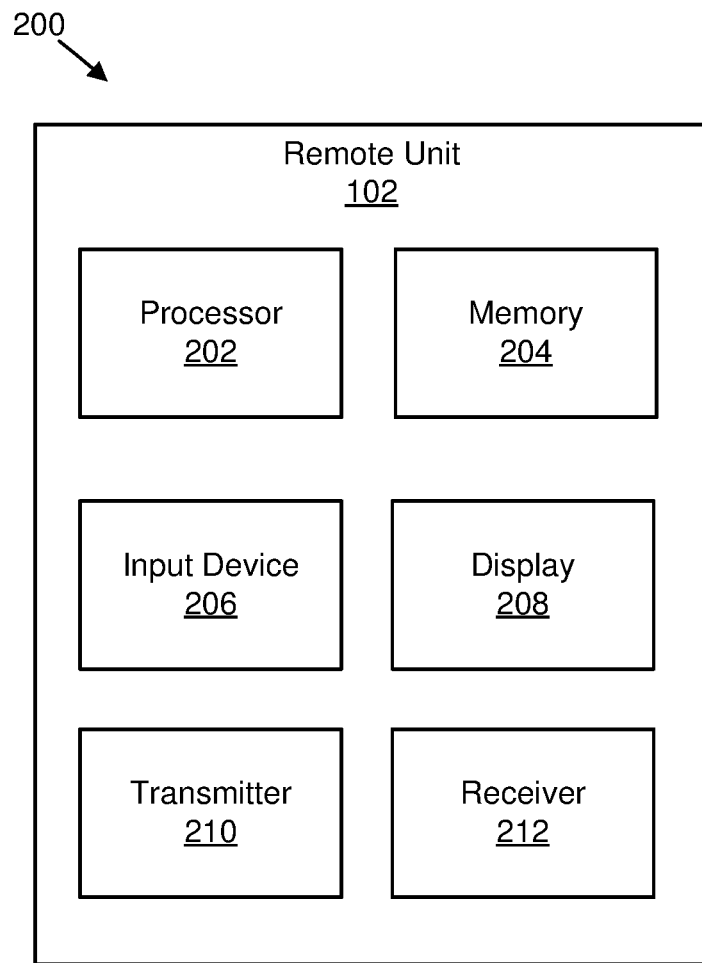
FIG. 2 is a schematic block diagram illustrating one embodiment of an apparatus that may be used for multiple radio access technology communications.

FIG. 2 depicts one embodiment of an apparatus 200 that may be used for multiple radio access technology communications. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 may: receive, from a first radio access technology, resources for a second radio access technology; and receive, from the first radio access technology, sidelink radio bearer configuration information.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
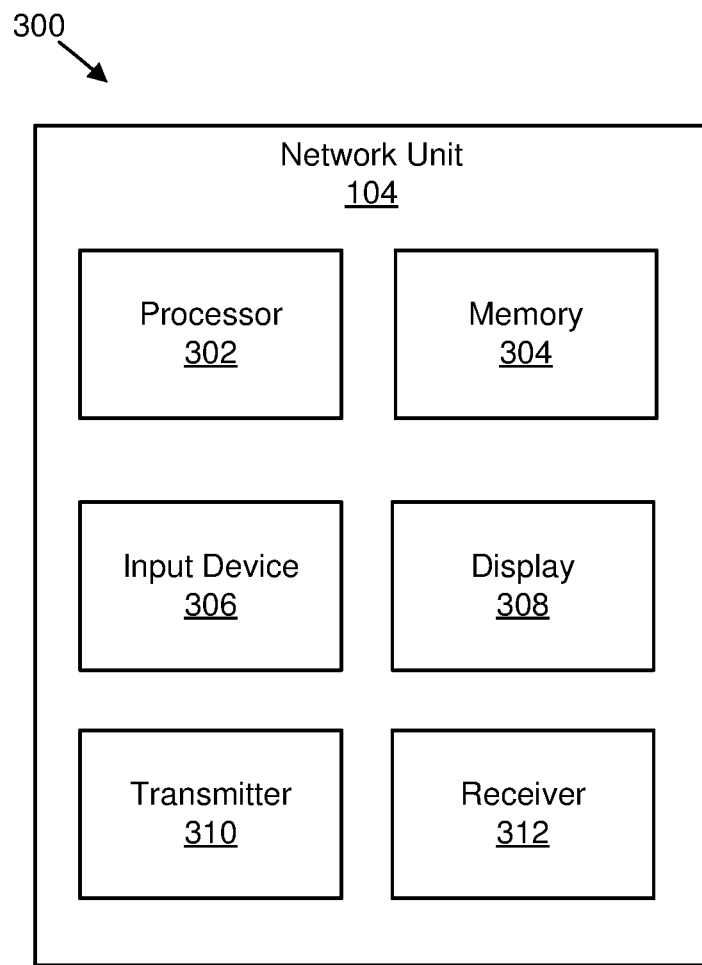
FIG. 3 is a schematic block diagram illustrating one embodiment of an apparatus that may be used for multiple radio access technology communications.

FIG. 3 depicts one embodiment of an apparatus 300 that may be used for multiple radio access technology communications. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may: transmit, from a first radio access technology, resources for a second radio access technology; and transmit, from the first radio access technology, sidelink radio bearer configuration information.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, two resource allocation modes may be used for each of NR and LTE V2X communication. The two resource allocation modes for LTE may be referred to as Mode 3 and Mode 4; and the two resource allocation modes for NR may be referred to as Mode 1 and Mode 2. These modes may support direct V2X communications but may differ on how they allocate the radio resources. In certain embodiments, the cellular network allocates resources (e.g., a gNB allocates Mode-1 resources and an eNB allocates Mode-3 resources). In various embodiments, if Mode-2 and Mode-4 are used, these modes may not require cellular coverage, and vehicles may autonomously select their radio resources using a distributed scheduling scheme supported by congestion control mechanisms from pre-configured resource pools. In some embodiments, a RAN for in-coverage UEs may allocate Mode-2 and Mode-4 resources. In certain embodiments, Mode-2 and/or Mode 4 may be considered a baseline mode and may represent an alternative to 802.11p or DSRC.

In various embodiments, all resource allocation modes may satisfy latency requirements, may accommodate high Doppler spreads, and/or may accommodate a high density of vehicles for V2X communications. In some embodiments, Mode-1 and Mode-3 may use a centralized RAN (e.g., a gNB and/or an eNB) scheduler. In certain embodiments, a vehicular UE and RAN may use a Uu interface to communicate (e.g., sending a BSR and/or SR from a transmitting V2X UE to the RAN and receiving in response a SL grant on PDCCH (DCI)). In various embodiments, Mode-2 and Mode-4 may use a PC5 interface that facilitates direct LTE SL communications between two vehicular UEs and/or may use distributed UE scheduling. In some embodiments, V2X Mode-2 and Mode-4 may operate without infrastructure support although the UEs may be in RAN coverage. In such embodiments, resources may be shared with a Uu uplink. In certain embodiments, such as in LTE V2X, only broadcast type transmission may be supported, while in other embodiments, such as in NR, V2X unicast and groupcast transmissions may be supported.

In some embodiments, a cross-RAT V2X PC5 may be used. In such embodiments, LTE coverage may be used to control NR PC5 using network scheduled mode of operation. In various embodiments, a NR (e.g., gNB) controlling LTE PC5 may be used both for network scheduled and UE autonomous modes of operation.

Figure 4:
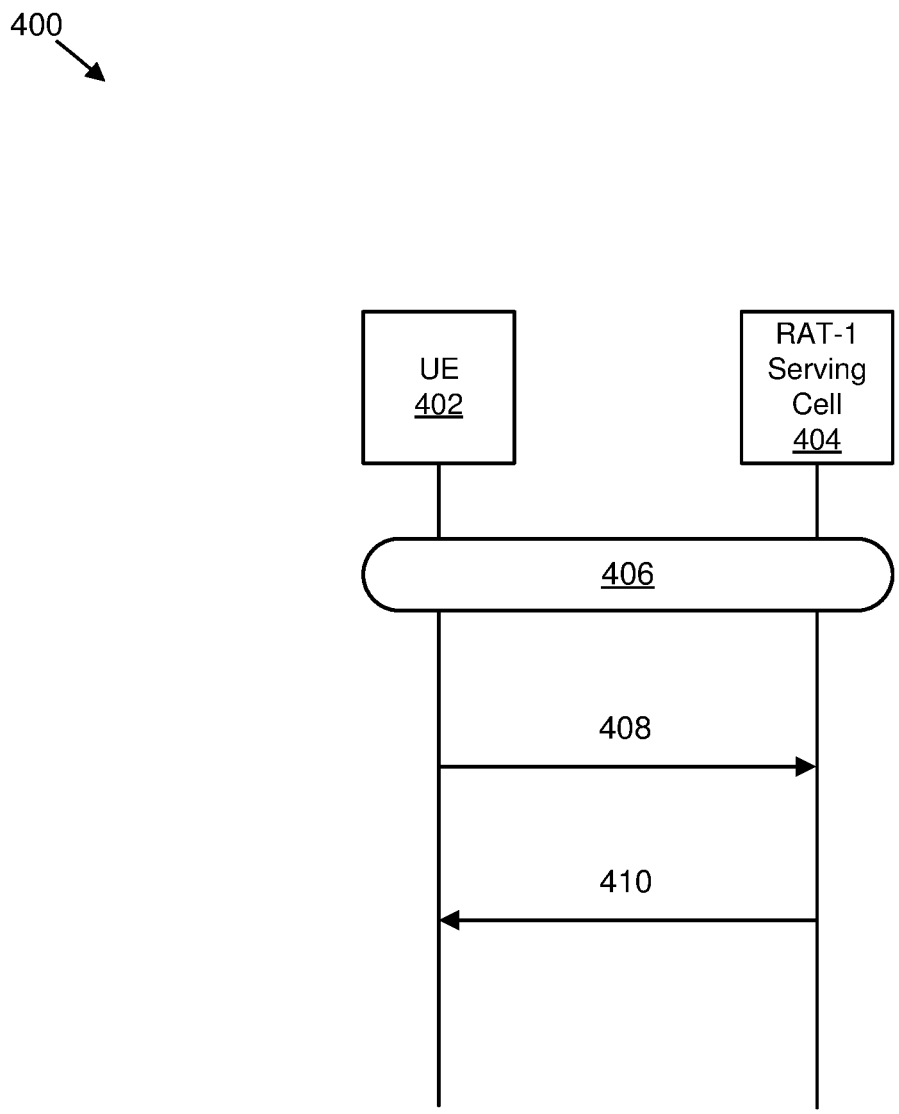
FIG. 4 is a schematic block diagram illustrating one embodiment of communications for cross RAT V2X resource allocation in an NS Mode.

FIG. 4 is a schematic block diagram illustrating one embodiment of communications 400 for cross RAT V2X resource allocation in an NS Mode. The communications 400 described herein may include one or more messages. The communications 400 include communications between a UE 402 and a RAT-1 serving cell 404 (e.g., a first RAT).

In a first communication 406 transmitted between the UE 402 and the RAT-1 serving cell 404, ongoing Uu connection messages are transmitted and received.

In a second communication 408 transmitted from the UE 402 to the RAT-1 serving cell 404, the UE 402 transmits an interest indication to the RAT-1 serving cell 404. The interest indication may be used by the UE 402 to request V2X resource in RAT-2 (e.g., a second RAT). In the second communication 408, the UE 402 may include PC5 QoS profiles (e.g., a VQI, a 5QI, a PPPP, and/or a PPPR) that are transmitted to the RAT-1 serving cell 404.

In a third communication 410 transmitted from the RAT-1 serving cell 404 to the UE 402, the RAT-1 serving cell 404 provides configured resources (e.g., SPS and/or grant free Type 1/Type 2), an SLRB configuration for each of the indicated PC5 QoS profiles, and/or an indication that a pre-configuration (e.g., configuration) may be used (e.g., by not including any SLRB configuration). In certain embodiments, the UE 402 configures a PC5 radio bearer on a RAT based on the information received from the RAT-1 serving cell 404 and may start data transmission and/or reception using the PC5 radio bearer.

Figure 5:
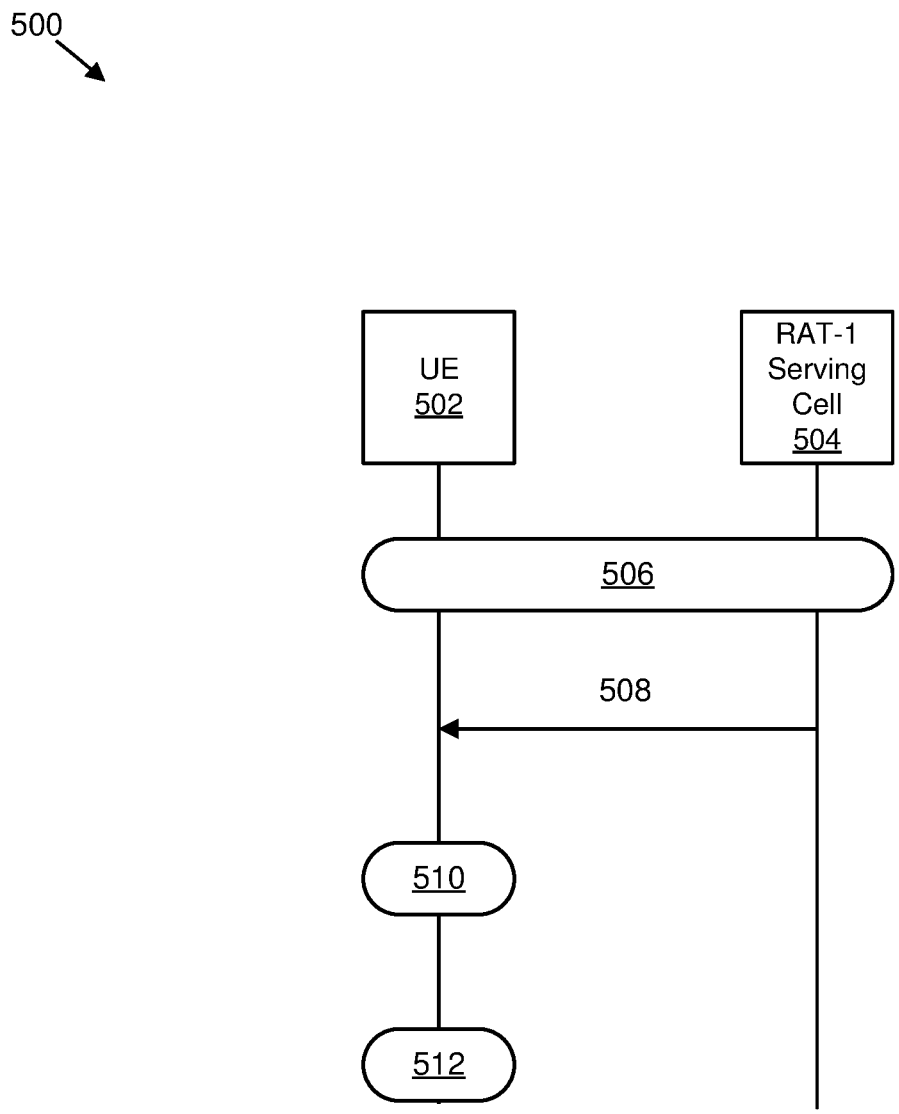
FIG. 5 is a schematic block diagram illustrating one embodiment of communications for cross RAT V2X resource allocation in a UE Autonomous Mode.

FIG. 5 is a schematic block diagram illustrating one embodiment of communications 500 for cross RAT V2X resource allocation in a UE Autonomous Mode. The communications 500 described herein may include one or more messages. The communications 500 include communications between a UE 502 and a RAT-1 serving cell 504 (e.g., a first RAT).

In a first communication 506 transmitted between the UE 502 and the RAT-1 serving cell 504, ongoing Uu connection messages are transmitted and received.

In a second communication 508 transmitted from the RAT-1 serving cell 504 to the UE 502, the RAT-1 serving cell 504 may perform a network broadcast of PC5 resources for RAT-2 (e.g., a second RAT), an SLRB configuration for each supported PC5 QoS profile for which the SLRB configuration is provided assuming minimum mandatory capability for cross RAT communication of a NR V2X UE, and/or an explicit indication (e.g., a Boolean indicating) that indicates that no SLRB configuration is provided by the RAT-1 serving cell 504 or that SLRB configurations are provided by a serving cell for the RAT-2 using RRC dedicated signaling only. If the explicit indication indicates that no SLRB configuration is provided by the RAT-1 serving cell 504, the UE 502 may use an SLRB pre-configuration corresponding to each PC5 QoS profiles for which data is available for transmission in the UE 502. If the explicit indication indicates that SLRB configurations are provided by a serving cell for the RAT-2 using RRC dedicated signaling only, the UE 502 may send an interest indication to the serving cell for the RAT-2 using RRC signaling and the network may then respond with an SLRB configuration corresponding to each indicated PC5 QoS profile. If the UE 502 is not RRC connected, a transition to an RRC connected state may be initiated to facilitate transmission of the interest indication.

Based on the network response, the UE 502 may make 510 a determination (e.g., decision) of which SLRB configuration to use and may configure one or more SLRBs accordingly.

In certain embodiments, the UE 502 configures 512 a PC5 radio bearer on an RAT and starts data transmission and/or reception on the PC5 radio bearer.

In various embodiments, Mode 1 and/or Mode 3 cross RAT resource allocation for configured (e.g., SPS and/or configured grant Type 1) resources using only RRC signaling may be accomplished by a network providing the network scheduled configured resources through RRC signaling for cross-RAT V2X communication and by the network implicitly and/or explicitly indicating if an L2 and/or L1 configuration is provided by a RAN node for cross-RAT V2X communication. In such embodiments, the UE may use a pre-configured and/or specified L2 and/or L1 configuration if it is not provided by a serving cell for cross-RAT V2X communication.

In some embodiments, a UE uses an on-demand system information request to a serving cell of RAT-1 if scheduling information of the cell in SIB1 indicates that PC5 resources and/or SLRB configuration for RAT2 may be provided in a corresponding SIB. The on-demand system information may not be broadcast system information.

In certain embodiments, a RAT-1 receives an SLRB configuration for each supported PC5 QoS profile (e.g., VQI and/or 5QI) from an operation and maintenance ("O&M") entity or from a RAT-2 cell.

In various embodiments, a pre-configuration described herein may refer to a pre-provisioned SLRB configuration for each supported PC5 QoS profile (e.g., VQI and/or 5QI).

In some embodiments, a pre-configuration described herein may refer to a specified SLRB configuration for each supported PC5 QoS profile (e.g., VQI and/or 5QI).

Figure 6:
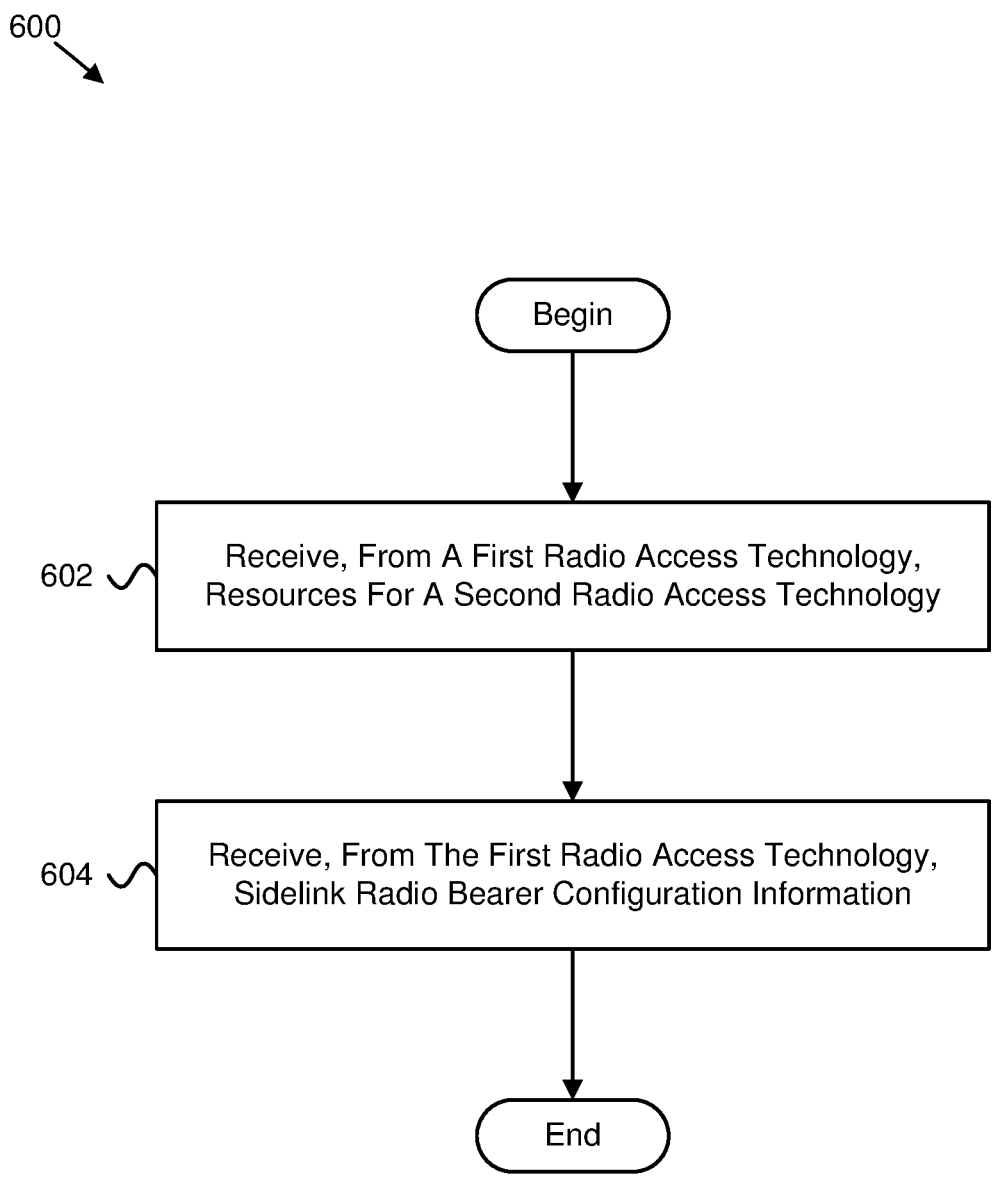
FIG. 6 is a flow chart diagram illustrating one embodiment of a method for multiple radio access technology communications.

FIG. 6 is a flow chart diagram illustrating one embodiment of a method 600 for multiple radio access technology communications. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, from a first radio access technology, resources for a second radio access technology. In certain embodiments, the method 600 includes receiving 604, from the first radio access technology, sidelink radio bearer configuration information.

In certain embodiments, the method 600 further comprises transmitting an interest indication that indicates a request for vehicle to everything resources in the second radio access technology. In some embodiments, the resources for the second radio access technology and the sidelink radio bearer configuration information are received in response to transmitting the interest indication. In various embodiments, the interest indication comprises one or more quality of service profiles.

In one embodiment, the one or more quality of services profiles comprise a vehicular quality index, a fifth generation quality of service indicator, a prose per packet priority, a prose per packet reliability, or some combination thereof. In certain embodiments, the interest indication comprises an on-demand system information request. In some embodiments, the resources for the second radio access technology comprise semi-persistent scheduling resources, grant-free resources, or a combination thereof.

In various embodiments, the sidelink radio bearer configuration information comprises a sidelink radio bearer configuration for each quality of service profile of one or more quality of service profiles. In one embodiment, the sidelink radio bearer configuration information comprises an indication to use preconfigured information for sidelink communication. In certain embodiments, the method 600 further comprises configuring a radio bearer on a radio access technology based on the resources for the second radio access technology, the sidelink radio bearer configuration information, or a combination thereof.

In some embodiments, the method 600 further comprises transmitting data on the radio bearer. In various embodiments, the method 600 further comprises receiving data on the radio bearer. In one embodiment, the resources for the second radio access technology and the sidelink radio bearer configuration information are received by a network broadcast.

Figure 7:
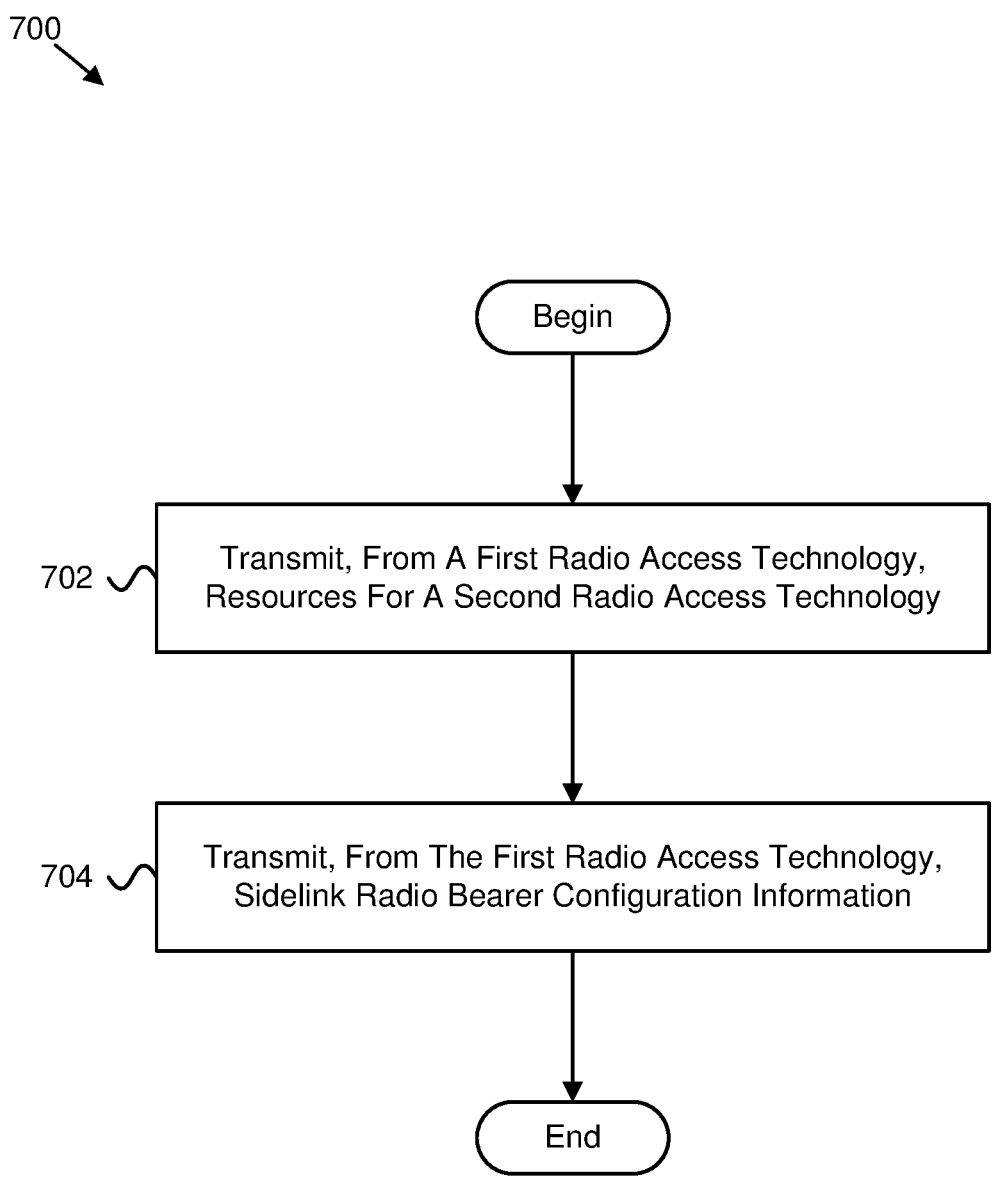
FIG. 7 is a flow chart diagram illustrating another embodiment of a method for multiple radio access technology communications.

FIG. 7 is a flow chart diagram illustrating another embodiment of a method 700 for multiple radio access technology communications. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702, from a first radio access technology, resources for a second radio access technology. In various embodiments, the method 700 includes transmitting 704, from the first radio access technology, sidelink radio bearer configuration information.

In certain embodiments, the method 700 further comprises receiving an interest indication that indicates a request for vehicle to everything resources in the second radio access technology. In some embodiments, the resources for the second radio access technology and the sidelink radio bearer configuration information are received in response to transmitting the interest indication. In various embodiments, the interest indication comprises one or more quality of service profiles.

In one embodiment, the one or more quality of services profiles comprise a vehicular quality index, a fifth generation quality of service indicator, a prose per packet priority, a prose per packet reliability, or some combination thereof. In certain embodiments, the interest indication comprises an on-demand system information request. In some embodiments, the resources for the second radio access technology comprise semi-persistent scheduling resources, grant-free resources, or a combination thereof.

In various embodiments, the sidelink radio bearer configuration information comprises a sidelink radio bearer configuration for each quality of service profile of one or more quality of service profiles. In one embodiment, the sidelink radio bearer configuration information comprises an indication to use preconfigured information for sidelink communication. In certain embodiments, the resources for the second radio access technology and the sidelink radio bearer configuration information are transmitted by a network broadcast.

In one embodiment, a method comprises: receiving, from a first radio access technology, resources for a second radio access technology; and receiving, from the first radio access technology, sidelink radio bearer configuration information.

In certain embodiments, the method further comprises transmitting an interest indication that indicates a request for vehicle to everything resources in the second radio access technology.

In some embodiments, the resources for the second radio access technology and the sidelink radio bearer configuration information are received in response to transmitting the interest indication.

In various embodiments, the interest indication comprises one or more quality of service profiles.

In one embodiment, the one or more quality of services profiles comprise a vehicular quality index, a fifth generation quality of service indicator, a prose per packet priority, a prose per packet reliability, or some combination thereof.

In certain embodiments, the interest indication comprises an on-demand system information request.

In some embodiments, the resources for the second radio access technology comprise semi-persistent scheduling resources, grant-free resources, or a combination thereof.

In various embodiments, the sidelink radio bearer configuration information comprises a sidelink radio bearer configuration for each quality of service profile of one or more quality of service profiles.

In one embodiment, the sidelink radio bearer configuration information comprises an indication to use preconfigured information for sidelink communication.

In certain embodiments, the method further comprises configuring a radio bearer on a radio access technology based on the resources for the second radio access technology, the sidelink radio bearer configuration information, or a combination thereof.

In some embodiments, the method further comprises transmitting data on the radio bearer.

In various embodiments, the method further comprises receiving data on the radio bearer.

In one embodiment, the resources for the second radio access technology and the sidelink radio bearer configuration information are received by a network broadcast.

In one embodiment, an apparatus comprises: a receiver that: receives, from a first radio access technology, resources for a second radio access technology; and receives, from the first radio access technology, sidelink radio bearer configuration information.

In certain embodiments, the apparatus further comprises a transmitter that transmits an interest indication that indicates a request for vehicle to everything resources in the second radio access technology.

In some embodiments, the resources for the second radio access technology and the sidelink radio bearer configuration information are received in response to transmitting the interest indication.

In various embodiments, the interest indication comprises one or more quality of service profiles.

In one embodiment, the one or more quality of services profiles comprise a vehicular quality index, a fifth generation quality of service indicator, a prose per packet priority, a prose per packet reliability, or some combination thereof.

In certain embodiments, the interest indication comprises an on-demand system information request.

In some embodiments, the resources for the second radio access technology comprise semi-persistent scheduling resources, grant-free resources, or a combination thereof.

In various embodiments, the sidelink radio bearer configuration information comprises a sidelink radio bearer configuration for each quality of service profile of one or more quality of service profiles.

In one embodiment, the sidelink radio bearer configuration information comprises an indication to use preconfigured information for sidelink communication.

In certain embodiments, the apparatus further comprises a processor that configures a radio bearer on a radio access technology based on the resources for the second radio access technology, the sidelink radio bearer configuration information, or a combination thereof.

In some embodiments, the apparatus further comprises a transmitter that transmits data on the radio bearer.

In various embodiments, the receiver receives data on the radio bearer.

In one embodiment, the resources for the second radio access technology and the sidelink radio bearer configuration information are received by a network broadcast.

In one embodiment, a method comprises: transmitting, from a first radio access technology, resources for a second radio access technology; and transmitting, from the first radio access technology, sidelink radio bearer configuration information.

In certain embodiments, the method further comprises receiving an interest indication that indicates a request for vehicle to everything resources in the second radio access technology.

In some embodiments, the resources for the second radio access technology and the sidelink radio bearer configuration information are received in response to transmitting the interest indication.

In various embodiments, the interest indication comprises one or more quality of service profiles.

In one embodiment, the one or more quality of services profiles comprise a vehicular quality index, a fifth generation quality of service indicator, a prose per packet priority, a prose per packet reliability, or some combination thereof.

In certain embodiments, the interest indication comprises an on-demand system information request.

In some embodiments, the resources for the second radio access technology comprise semi-persistent scheduling resources, grant-free resources, or a combination thereof.

In various embodiments, the sidelink radio bearer configuration information comprises a sidelink radio bearer configuration for each quality of service profile of one or more quality of service profiles.

In one embodiment, the sidelink radio bearer configuration information comprises an indication to use preconfigured information for sidelink communication.

In certain embodiments, the resources for the second radio access technology and the sidelink radio bearer configuration information are transmitted by a network broadcast.

In one embodiment, an apparatus comprises: a transmitter that: transmits, from a first radio access technology, resources for a second radio access technology; and transmits, from the first radio access technology, sidelink radio bearer configuration information.

In certain embodiments, the apparatus further comprises a receiver that receives an interest indication that indicates a request for vehicle to everything resources in the second radio access technology.

In some embodiments, the resources for the second radio access technology and the sidelink radio bearer configuration information are received in response to transmitting the interest indication.

In various embodiments, the interest indication comprises one or more quality of service profiles.

In one embodiment, the one or more quality of services profiles comprise a vehicular quality index, a fifth generation quality of service indicator, a prose per packet priority, a prose per packet reliability, or some combination thereof.

In certain embodiments, the interest indication comprises an on-demand system information request.

In some embodiments, the resources for the second radio access technology comprise semi-persistent scheduling resources, grant-free resources, or a combination thereof.

In various embodiments, the sidelink radio bearer configuration information comprises a sidelink radio bearer configuration for each quality of service profile of one or more quality of service profiles.

In one embodiment, the sidelink radio bearer configuration information comprises an indication to use preconfigured information for sidelink communication.

In certain embodiments, the resources for the second radio access technology and the sidelink radio bearer configuration information are transmitted by a network broadcast.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment, the method comprising:
receiving, from a first radio access technology, a plurality of sidelink communication profiles, wherein each sidelink communication profile of the plurality of sidelink communication profiles comprises resources for a second radio access technology, each sidelink communication profile comprises a different quality of service profile, and each different quality of service profile comprises a different vehicle quality index, a different fifth generation quality of service indicator, or a combination thereof; and receiving, from the first radio access technology, sidelink radio bearer configuration information for each sidelink communication profile of the plurality of sidelink communication profiles.

2. The method of claim 1, further comprising transmitting an interest indication that indicates a request for vehicle to everything resources in the second radio access technology.

3. The method of claim 2, wherein the resources for the second radio access technology and the sidelink radio bearer configuration information are received in response to transmitting the interest indication.

4. The method of claim 2, wherein the interest indication comprises one or more quality of service profiles.

5. The method of claim 4, wherein the one or more quality of services profiles comprise a vehicular quality index, a fifth generation quality of service indicator, a prose per packet priority, a prose per packet reliability, or some combination thereof.

6. The method of claim 2, wherein the interest indication comprises an on-demand system information request.

7. The method of claim 1, wherein the resources for the second radio access technology comprise semi-persistent scheduling resources, grant-free resources, or a combination thereof.

8. The method of claim 1, wherein the sidelink radio bearer configuration information comprises a sidelink radio bearer configuration for each quality of service profile of one or more quality of service profiles.

9. The method of claim 1, wherein the sidelink radio bearer configuration information comprises an indication to use preconfigured information for sidelink communication.

10. The method of claim 1, further comprising configuring a radio bearer on a radio access technology based on the resources for the second radio access technology, the sidelink radio bearer configuration information, or a combination thereof.

11. The method of claim 10, further comprising transmitting data on the radio bearer.

12. The method of claim 10, further comprising receiving data on the radio bearer.

13. The method of claim 1, wherein the resources for the second radio access technology and the sidelink radio bearer configuration information are received by a network broadcast.

14. An apparatus comprising a user equipment, the apparatus further comprising:
a receiver that:
receives, from a first radio access technology, a plurality of sidelink communication profiles, wherein each sidelink communication profile of the plurality of sidelink communication profiles comprises resources for a second radio access technology, each sidelink communication profile comprises a different quality of service profile, and each different quality of service profile comprises a different vehicle quality index, a different fifth generation quality of service indicator, or a combination thereof; and
receives, from the first radio access technology, sidelink radio bearer configuration information for each sidelink communication profile of the plurality of sidelink communication profiles.

15. The apparatus of claim 14, further comprising a transmitter that transmits an interest indication that indicates a request for vehicle to everything resources in the second radio access technology.

16. A method comprising:
transmitting, from a first radio access technology, a plurality of sidelink communication profiles, wherein each sidelink communication profile of the plurality of sidelink communication profiles comprises resources for a second radio access technology, each sidelink communication profile comprises a different quality of service profile, and each different quality of service profile comprises a different vehicle quality index, a different fifth generation quality of service indicator, or a combination thereof; and
transmitting, from the first radio access technology, sidelink radio bearer configuration information for each sidelink communication profile of the plurality of sidelink communication profiles.

17. The method of claim 16, further comprising receiving an interest indication that indicates a request for vehicle to everything resources in the second radio access technology.

18. The method of claim 16, wherein the resources for the second radio access technology comprise semi-persistent scheduling resources, grant-free resources, or a combination thereof.

19. The method of claim 16, wherein the sidelink radio bearer configuration information comprises a sidelink radio bearer configuration for each quality of service profile of one or more quality of service profiles.

20. The method of claim 16, wherein the sidelink radio bearer configuration information comprises an indication to use preconfigured information for sidelink communication.

21. The method of claim 16, wherein the resources for the second radio access technology and the sidelink radio bearer configuration information are transmitted by a network broadcast.

22. An apparatus comprising:
a transmitter that:
transmits, from a first radio access technology, a plurality of sidelink communication profiles, wherein each sidelink communication profile of the plurality of sidelink communication profiles comprises resources for a second radio access technology, each sidelink communication profile comprises a different quality of service profile, and each different quality of service profile comprises a different vehicle quality index, a different fifth generation quality of service indicator, or a combination thereof; and
transmits, from the first radio access technology, sidelink radio bearer configuration information for each sidelink communication profile of the plurality of sidelink communication profiles.

* * * * *